May 11, 1926.　　　　T. LOEFFELMAN　　　　1,584,620
REVERSIBLE PLOW
Filed Nov. 5, 1925　　　2 Sheets-Sheet 1
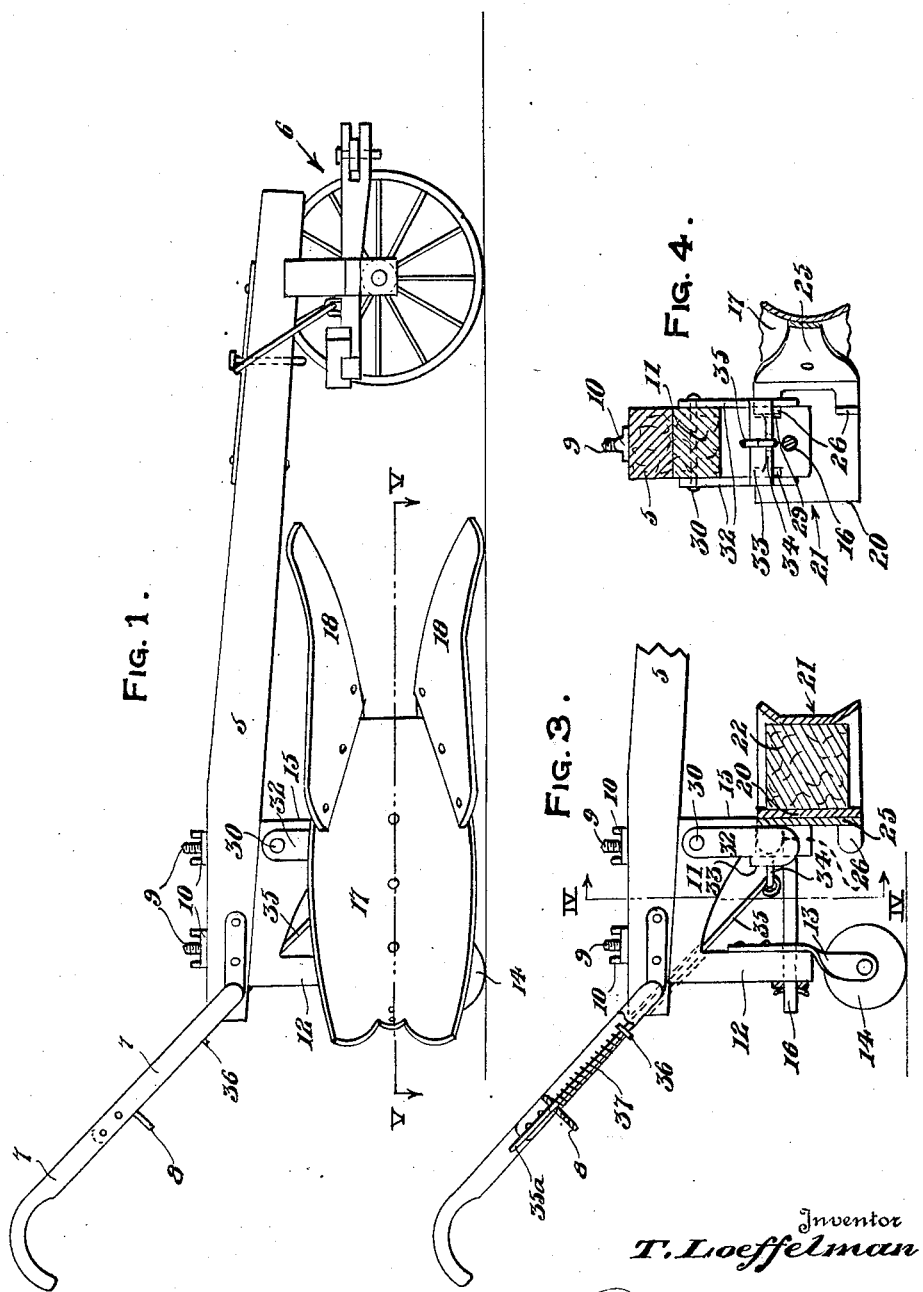
Inventor
T. Loeffelman May 11, 1926.
T. LOEFFELMAN
1,584,620
REVERSIBLE PLOW
Filed Nov. 5, 1925
2 Sheets-Sheet 2
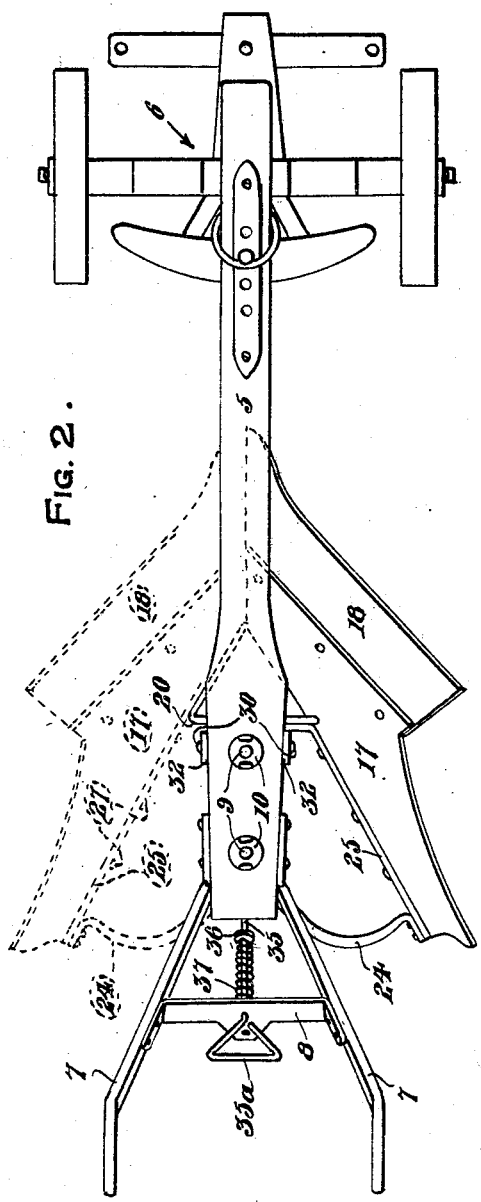
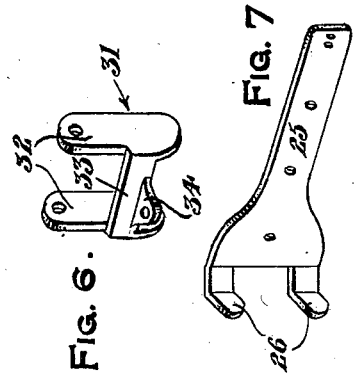
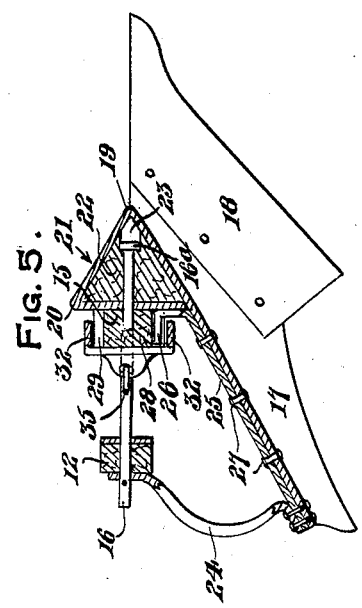
Inventor
T. Loeffelman
By *Bryant & Lowry*
Attorneys Patented May 11, 1926.

1,584,620

UNITED STATES PATENT OFFICE.

THOMAS LOEFFELMAN, OF ST. LOUIS, MISSOURI.

REVERSIBLE PLOW.

Application filed November 5, 1925. Serial No. 67,167.

This invention relates to new and useful improvements in reversible plows.

The primary object of this invention is to provide an improved mounting structure for the moldboard and shares of a reversible plow.

A further object of the invention is to provide a novel mechanism for holding the said moldboard in either of its operative positions.

Other objects and advantages of the invention will be apparent during the course of the following description.

In the accompanying drawings forming a part of this specification and in which like numerals are employed to designate like parts throughout the same, Figure 1 is a side elevational view of the reversible plow constructed in accordance with this invention, Figure 2 is a top plan view of the plow and shows the reversible moldboard and shares in full lines in one position and in dotted lines in its remaining operative position, Figure 3 is a fragmentary vertical sectional view, partly in elevation, showing the detail features of a novel mechanism employed for holding the moldboard in either of its operative positions, Figure 4 is a vertical sectional view taken upon line IV—IV of Fig. 3, Figure 5 is a horizontal sectional view taken upon line V—V of Fig. 1, and Figures 6 and 7 show detail perspective views of the bolt and keeper members employed for holding the moldboard in its operative positions.

In the drawings, wherein for the purpose of illustration is shown a preferred embodiment of this invention, the numeral 5 designates the plow beam which is supported at its forward end by a wheeled carriage 6 which may be of any conventional form and which is adjustably connected to the forward end of the beam to permit different depth furrows to be formed by the plow.

Connected to the rear end of the plow beam 5 are the handles 7 which diverge rearwardly in the customary manner and are braced intermediate their ends by the cross brace 8.

The rear end portion of the plow beam 5 also has detachably connected thereto, as by the threaded posts 9 and wing nuts 10, an inverted, substantially U-shaped standard 11. The rear leg 12 of the standard 11 has depending therefrom a bifurcated bracket 13 which supports the rear ground wheel 14, in the manner best illustrated in Fig. 3.

Extending horizontally through the lower end portions of the legs 12 and 15 of the standard 11 is a shaft 16 that is employed for supporting the reversible moldboard and shares. The reference character 17 designates the moldboard of the plow which has properly fastened thereto the shares 18. The forward end portion of the moldboard 17 is clearly illustrated in Figs. 2 to 5 inclusive as consisting of an elongated extension which is bent rearwardly at 19 and upon itself at 20 to form an open ended triangle which will be designated in its entirety by the reference character 21. This triangle has mounted therein a block 22 which is recessed at 23 for the reception of the head 16ᵃ of the shaft 16, which shaft extends through the block 22 and the rear wall of the triangle 21. The various figures just referred to illustrate the triangle 21 with its filling block 22 as directly bearing against the forward leg 15 of the standard 11 and it will be understood that all stress applied to the moldboard and shares will be directly transferred to the plow beam 5 by the engagement of the triangle 21 with the forward leg 15 of the standard 11. The rear end portion of the moldboard 17 is connected to and held in proper spaced relation in respect to the rear end of the shaft 16 by the bowed brace 24. This rear brace 24 is bowed so that it will clear the rear ground wheel 14 when the moldboard is reversed from one to the other of its operative positions.

In Fig. 7 there is shown in detail what will be termed a double, rigid bolt which includes the elongated body portion 25 and the angular bolt fingers 26. Figures 2 and 5 best illustrate the manner in which this double bolt is secured to the rear face of the moldboard 17. The elongated body portion 25 of the double bolt is fastened to the mold board 17 by the rivets, or other suitable fastening means 27 to extend longitudinally of the said board. The angular bolt fingers 26 are thereby arranged in juxtaposition to the rear wall of the triangle 21. Figures 3 to 5 inclusive show one of the angle bolt fingers 26 as being arranged within a notch 28 formed in the side of the forward leg 15 of the standard 11. This angle member 26 is located in the notch 28 when the mold board and shares are arranged in one of their operative positions, i. e., the operative position to throw a furrow to the right of the plow beam 5. It will be understood that when the moldboard 17 and shares 18 are thrown into the dotted line position illustrated in Fig. 2, the remaining angular bolt finger 26 will be received within the notch 29 formed in the opposite side of the forward leg 15, and best illustrated in Fig. 5.

Figures 3 to 5 inclusive show the standard 15 as having depending therefrom and pivotally connected thereto, as at 30, the double keeper 31 which is illustrated in detail in Fig. 6. This keeper includes the parallel side members 32 which are interconnected by the brace 33 having the apertured ears 34. Connected to the ear 34, see Fig. 3, is an operating rod 35 which extends longitudinally of the plow handles 7 and through a suitable aperture formed in the cross brace 8 of said handles. Interposed between a stop collar 36, fastened to the rod 35, and the lower face of the brace bar 8 is a spring 37 which functions to constantly retain the double keeper 31 in its operative position, which operative position is with the cross brace member 33 flushly engaging the rear face of the forward leg 15 and with the side members 32 overlying the notches 28 and 29 formed in the leg 15. It will now be seen that when the double keeper 31 is in its operative position, the angular bolt finger 26 located within a notch 28 or 29 will be held therein. It will also be understood that to reverse the mold board 17, it is only necessary to move the rod 35 longitudinally, by means of its operating handle 35ª, for pivoting the double keeper 31 into an inoperative position which will uncover the notches 28 and 29, whereupon the moldboard may be reversed to locate its second angular bolt finger 26 in the opposite notch. The return of the double keeper 31 to its operative position will again hold the moldboard rigid in respect to the beam 5 and standard 11.

It is to be understood that the form of this invention herewith shown and described is to be taken as a preferred example of the same, and that various changes in the shape, size, and arrangement of parts may be resorted to without departing from the spirit of the invention or the scope of the subjoined claim.

Having thus described the invention, I claim:—

In a reversible plow, a beam, an inverted U-shaped standard depending therefrom, a shaft carried by the legs of the standard, a moldboard, a block carried by the forward end of the moldboard through which said shaft extends, a bracket depending from the rear leg of the standard, a ground wheel carried by the bracket, and a brace member extending from the shaft to the rear end of the moldboard, said brace member being bowed so that it will pass the ground engaging wheel when the moldboard is moved from one to the other of its operative positions.

In testimony whereof I affix my signature.

THOMAS LOEFFELMAN.